(12) United States Patent
Ilic et al.

(10) Patent No.: US 10,004,135 B2
(45) Date of Patent: Jun. 19, 2018

(54) SYSTEMS AND METHODS FOR PARTICLE GUIDING

(71) Applicants: Ognjen Ilic, Cambridge, MA (US); Ido Kaminer, Cambridge, MA (US); Marin Soljacic, Belmont, MA (US); Yoav Lahini, Belmont, MA (US)

(72) Inventors: Ognjen Ilic, Cambridge, MA (US); Ido Kaminer, Cambridge, MA (US); Marin Soljacic, Belmont, MA (US); Yoav Lahini, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 36 days.

(21) Appl. No.: 15/245,641

(22) Filed: Aug. 24, 2016

(65) Prior Publication Data

US 2017/0064807 A1 Mar. 2, 2017

Related U.S. Application Data

(60) Provisional application No. 62/208,908, filed on Aug. 24, 2015.

(51) Int. Cl.
*H05H 3/04* (2006.01)
*C01B 21/076* (2006.01)
*G02B 21/32* (2006.01)

(52) U.S. Cl.
CPC .............. *H05H 3/04* (2013.01); *C01B 21/076* (2013.01); *G02B 21/32* (2013.01)

(58) Field of Classification Search
CPC .......... H05H 3/04; G02B 21/32; C01B 21/076
USPC ........................................................ 250/251
See application file for complete search history.

(56) References Cited

U.S. PATENT DOCUMENTS

2002/0160195 A1 10/2002 Halas et al.
2012/0157346 A1 6/2012 Seul et al.

OTHER PUBLICATIONS

Nedev, et al ("An optically controlled microscale elevator using plasmonic Janus particles" ACS Photonics, 2, pp. 491-496 (Feb. 16, 2015).*
Zhang, et al ("Light-triggered reversible self-assembly of gold nanoparticle oligomers for tunable SERS" Langmuir, vol. 31, pp. 1164-1171, Dec. 25, 2014.*
Huisken, et al ("Three-dimensional optical manipulation using four collimated intersecting laser beams" Optics Express, vol. 15, No. 8, Apr. 16, 2007, pp. 4921-4928.*

(Continued)

*Primary Examiner* — Michael Maskell
(74) *Attorney, Agent, or Firm* — Cooley LLP

(57) ABSTRACT

A technique to guide a micro- or nano-scale particle uses the wavelengths of light beams to control the direction of motion of the particle. In this technique, an optical asymmetry is introduced into the particle to form a composite particle. The composite particle includes two faces that preferentially absorb light of different wavelengths, independent of the particle orientation. The difference in absorption spectra of the two faces creates a bidirectional and local thermal gradient that is externally switchable by changing the wavelength of the incident light beams. This thermal gradient induces a thermophoretic drift that moves the composite particle. A two-faced nanoparticle can be guided using the optically induced thermophoretic drift as the propulsion mechanism.

26 Claims, 14 Drawing Sheets

(56) References Cited

OTHER PUBLICATIONS

Bregulia, et al ("Stochastic localization of microswimmers by photon nudging" ACS Nano, vol. 8, No. 7, 2014, pp. 6542-6550.*
Palacci, et al ("Photo-activated colloidal dockers for cargo transportation" J. Am. Chem. Soc. 2013, 135, pp. 15978-15981.*
Guler, et al ("Local heating with lithographically fabricated plasmonic titanium nitride nanoparticles" Nano Letters, 2013, 13, 6078-6083.*
Allen et al., "Orbital angular momentum of light and the transformation of Laguerre-Gaussian laser modes," Physical Review A, vol. 45, No. 11, pp. 8185-8190 (1992).
Ashkin, "Acceleration and trapping of particles by radiation pressure," Physical Review Letters, vol. 24, No. 4, pp. 156-159 (1970).
Ashkin, "Optical levitation by radiation pressure," Appl. Phys. Lett., vol. 19, No. 8, pp. 283-285 (1971).
Baraban et al., "Fuel-free locomotion of janus motors: Magnetically induced thermophoresis," Article, ACS Nano, vol. 7, No. 2, pp. 1360-1367 (2013).
Bickel et al. "Flow pattern in the vicinity of self-propelling hot Janus particles," Physical Review, American Physical Society, E 88, 012301-1-012301-6 (2013).
Braibanti et al., "Does thermophoretic mobility depend on particle size?" Physical Review Letters, PRL 100, pp. 108303(4) (2008).
Bregulla et al. "Stochastic Localization of Microswimmers by Photon Nudging," Article, ACS NANO, vol. 8, No. 7, pp. 6542-6550 (2014).
Byrnes et al., "Light promotes regeneration and functional recovery and alters the immune response after spinal cord injury," Lasers in Surgery and Medicine, 36, pp. 171-185 (2005).
Chen et al., "Optical pulling force," Nature Photonics, vol. 5, pp. 531-534 (2011).
Dreyfus et al., "Microscopic artificial swimmers," Nature, Letters, vol. 437, No. 6, pp. 862-865 (2005).
Duhr et al., "Why molecules move along a temperature gradient," Proceedings of the National Academy of Sciences, vol. 103, No. 52, pp. 19678-19682 (2006).
F.J. Garcia de Abajo, "Electromagnetic forces and torques in nanoparticles irradiated by plane waves," Journal of Quantitative Spectroscopy and Radiative Transfer, 89, pp. 3-9 (2004).
Fan et al., "Controllable high-speed rotation of nanowires," Physical Review Letters, 94(24) (2005).
Friese et al., "Optical alignment and spinning of laser-trappedmicroscopic particles," Letters to Nature, Nature, vol. 395, pp. 348-350 (1998).
Friese et al., "Optical angular-momentum transfer to trapped absorbing particles," Physical Review A, vol. 54, No. 2, pp. 1593-1596, (1996).
Golestanian et al., "Designing phoretic micro- and nano-swimmers," New Journal of Physics, 9, pp. 126-126 (2007).
Grier, "A revolution in optical manipulation," insight review articles, Nature, vol. 424, pp. 810-816 (2003).
Guler et al., "Local heating with lithographically fabricated plasmonic titanium nitride nanoparticles," Nano Letters, 13, pp. 6078-6083 (2013).
He et al., "Direct observation of transfer of angular momentum to absorptive particles from a laser beam with a phase singularity," Physical Review Letters, vol. 75, No. 5, pp. 826-829 (1995).
Ilic et al., "Exploiting Optical Asymmetry for Controlled Guiding of Particles with Light," ACS Photonics, 3, pp. 197-202, (Jan. 12, 2016).
Jiang et al., "Active Motion of a Janus Particle by Self-Thermophoresis in a Defocused Laser Beam," Physical Review Letters, PRL105(26), pp. 268302-1-268302-4 (2010).
Jones, T. B., "Basic theory of dielectrophoresis and electrorotation," IEEE, Engineering Medidcone and Biology Magazinne, 22, pp. 33-42 (2003).
Jones, T. B., "Quincke rotation of spheres," IEEE Transactions of Industry Appllications, vol. IA-20, No. 4, pp. 845-849 (1984).
Juan, "Plasmon nano-optical tweezers," Nature Photonics, vol. 5, pp. 349-356 (2011).
Lamhot et al., "Optical control of thermocapillary effects in complex nanofluids," Physical Review Letters, PRL103, pp. 264503-1-264503-4 (2009).
Lamhot et al., "Self-trapping of optical beams through thermophoresis," Physical Review Letters, PRL 105, pp. 163906-1-163906-4 (2010).
Lei et al., "Viscous torque on a sphere under arbitrary rotation," Applied Physical Letters, 89, 181908(3) (2006).
Lemons et al., Paul Langevin's 1908 paper "On the Theory of Brownian Motion", American Journal of Physics, 65(11), pp. 1079-1801 (1997).
Lewis et al., "The rotational Brownian motion of a sphere," Physics Letters, vol. A 49, No. 4, pp. 303-305 (1974).
Liu et al., "Light-driven nanoscale plasmonic motors," Nature Nanotechnology, vol. 5, pp. 570-573 (2010).
Mallouk et al., "Powering Nanorobots," Nanotechnology, Scientific American, 300, pp. 72-77 (2009).
Mano et al., "Bioelectrochemical propulsion," Journal of the American Chemical Society, 127, pp. 11574-11575 (2005).
Nedev et al., "An optically controlled microscale elevator using plasmonic janus particles," Article, ACS Photonics, 2, pp. 491-496 (Feb. 16, 2015).
Nemec et al., "Experimental observation of the optical spin transfer torque." Nature Physics 8, pp. 411-415 (2012).
Padgett et al., "Tweezers with a twist," Focus Review Articles, Nature Photonics, vol. 5, pp. 343-348, (2011).
Paterson et al., "Controlled rotation of optically trapped microscopic particles," Reports, Science, vol. 292, pp. 912-914 (2001).
Paxton et al., "Motility of catalytic nanoparticles through self-generated forces," Chemistry, A European Journal, 11, pp. 6462-6470 (2005).
Piazza, "Thermal forces: colloids in temperature gradients," Journal of Physics and Condensed Matter, 16, pp. S4195-S4211 (2004).
Putnam et al., "Temperature dependence of thermodiffusion in aqueous suspensions of charged nanoparticles," Langmuir, vol. 23, No. 18, pp. 9221-9228 (2007).
Qian et al., "Harnessing thermal fluctuations for purposeful activities: the manipulation of single microswimmers by adaptive photon nudging," Chemical Science, RSC Publishing, 4, pp. 1420-1429 (2013).
Rao et al., "A force to be reckoned with: A review of synthetic microswimmers powered by ultrasound," Reviews, Small, vol. 11, No. 24, pp. 2836-2846 (Jun. 24, 2015).
Rings et al., "Theory of hot brownian motion," Soft Matter, 7, pp. 3441-3452 (2011).
Shvedov et al., "A long-range polarization-controlled optical tractor beam," Letters, Nature Photonics, vol. 8, pp. 846-850 (2014).
Simpson et al., "Mechanical equivalence of spin and orbital angular momentum of light: an optical spanner," Optics Letters, vol. 22. No. 1, pp. 52-54 (1997).
Tong et al., "Alignment, rotation, and spinning of single plasmonic nanoparticles and nanowires using polarization dependent optical forces," Nano Letters, 10, pp. 268-273 (2010).
Walther et al., "Janus Particles: Synthesis, Self-Assembly, Physical Properties, and Applications," Review, Chemical Reviews.
Wang et al., "Edge magnetoplasmons and the optical excitations in graphene disks," Physical Review, B86, pp. 125450(5) (2012).
Wang et al., "Trapping and rotating nanoparticles using a plasmonic nano-tweezer with an integrated heat sink," Nature Communications, 2:469, pp. 1-6 (2011).
Whitesides, "The once and future nanomachine," Nanoinspirations, Scientific American, 285, pp. 78-83 (2001).
Zong et al., "An Optically Driven Bistable Janus Rotor with Patterned Metal Coatings," Article, ACS NANO, vol. 9, No. 11, pp. 10844-10851 (Oct. 20, 2015).
Huisken et al., "Three-dimensional optical manipulation using four collimated intersecting laser beams," Optics Express, vol. 15, No. 8, 9 pages, Apr. 16, 2007.
Zhang et al., "Optical tweezers for single cells," Journal of the Royal Society, Interface, vol. 5, pp. 671-690, Apr. 1, 2008.

(56) References Cited

OTHER PUBLICATIONS

Zhang et al., "Light-Triggered Reversible Self-Assembly of Gold Nanoparticle Oligomers for Tunable SERS," Langmuir, vol. 31, pp. 1164-1171, Dec. 25, 2014.
Palacci et al., "Photo-Activated Colloidal Dockers for Cargo Transportation," Philosophical Journal of the American Chemical Society, vol. 135, No. 43, pp. 15978-15981, Oct. 21, 2013.
Palacci et al., "Light-Activated Self-Propelled Colloids," Philsophical Transactions of the Royal Soceity of London, A Mathematical, Physical and Engineering Sciences, vol. 372, No. 2029, 36 pages, 2014.
International Search Report and Written Opinion issued by the International Searching Authority regarding International Application No. PCT/US16/48315, dated Nov. 16, 2016, 15 pages.

\* cited by examiner

US 10,004,135 B2

SYSTEMS AND METHODS FOR PARTICLE GUIDING

CROSS-REFERENCES TO RELATED APPLICATIONS

This application claims priority to U.S. provisional application Ser. No. 62/208,908, filed Aug. 24, 2015, entitled "METHOD FOR GUIDING NANO AND MICRO SCALE OBJECTS BASED ON EXTERNALLY CONTROLLED MULTI-DIRECTIONAL ENVIRONMENT GRADIENTS," which is hereby incorporated herein by reference in its entirety.

GOVERNMENT SUPPORT

This invention was made with Government support under Grant No. DMR-1419807 awarded by the National Science Foundation and under Contract No. W911NF-13-D-0001 awarded by the Army Research Office. The Government has certain rights in the invention.

BACKGROUND

Controlling the motion of nano- and micro-scale particles and objects has been a long-sought goal in science and engineering. These functional particles, also referred to as micro-robots, micro-swimmers, or nano-motors, can have a wide range of applications, including biology, medicine, microfluidics and colloidal science.

Conventional methods of controlling the motion of nano- and micro-scale particles usually rely on chemical, electric, magnetic, acoustic, and temperature effects to power the transport of the particles. However, these methods usually suffer the drawbacks of failing to provide controllable and high-speed movement, poor biocompatibility, and little to no ability to operate in biologically relevant environments.

Light can also be used to transport and guide particles of sizes that are substantially similar to or less than the wavelength of the light. Examples of optical guiding include optical tweezers and optical tractor beams. However, these approaches typically include beam shaping to realize complex electromagnetic field profiles and are thus sensitive to scattering.

Light-induced thermal effects can be employed to address the sensitivity to scattering. For example, in a metal-dielectric particle (e.g., a Janus particle), the heat generated by the absorption of light in the metal side can induce a local temperature difference, resulting in propulsion (i.e., thermophoresis) along the axis of the temperature gradient. Because the thermophoretic drift is based on absorption of light, it can be robust to scattering in the surrounding environment. However, thermophoretic drift typically points in the same direction. Therefore, it can be challenging to guide or steer the particle along other directions, thereby rendering it difficult for the particle to reach an arbitrary target location. In existing thermophoretic guiding schemes, the particle guided by light-actuated thermophoresis is usually monitored in real time and actuated by light only when its orientation satisfies a certain condition (e.g., when the particle is facing toward the target location). This results in slow guiding speeds and the need for complex optical instrumentation.

SUMMARY

Embodiments of the present invention include apparatus, systems, and methods for particle guiding. In one example, a method of moving a composite particle is disclosed. The composite particle includes a first side and a second side. The method includes illuminating the composite particle with a first beam of light at a first wavelength to create a first thermophoretic drift along a first direction from the first side toward the second side. The first thermophoretic drift moves the at least one composite particle along the first direction. The method also includes illuminating the composite particle with a second beam of light at a second wavelength, different from the first wavelength, to create a second thermophoretic drift along a second direction from the second side toward the first side. The second thermophoretic drift moves the at least one composite particle along the second direction.

In another example, system for conveying an agent includes at least one composite particle to receive the agent. The at least one composite particle has a first side and a second side. The system also includes at least one light source to illuminate the at least one composite particle with a first beam of light at a first wavelength and a second beam of light at a second wavelength different from the first wavelength so as to move the at least one composite particle via a thermophoretic drift induced by at least one of the first beam of light and the second beam of light. The system further includes a monitoring system to monitor at least one of a direction of motion of the at least one composite particle or a distance between the at least one composite particle and a target location. Upon illumination by the first beam of light, the thermophoretic drift is along a first direction from the first side toward the second side. Upon illumination by the second beam of light, the thermophoretic drift is along a second direction from the second side toward the first side.

In yet another example, a composite particle includes a core having a first side, a second side opposite the first side, and a diameter of about 10 nm to about 100 µm. The composite particle also includes a first layer comprising TiN conformally disposed on the first side of the core and a second layer comprising gold conformally disposed on the second side of the core. The first layer defines a first solid angle and the second layer defines a second solid angle greater than the first solid angle. Upon illumination by a first beam of light at a first wavelength, the first layer has a first temperature greater than a second temperature of the second layer so as to create a first thermophoretic drift along a first direction from the first layer toward the second layer. Upon illumination by a second beam of light at a second wavelength, the first layer has a third temperature less than a fourth temperature of the second layer so as to create a second thermophoretic drift along a second direction from the second layer toward the first layer.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Overview

To overcome the problem that thermophoretic drift in conventional optical guiding techniques points in only one direction, systems and methods described herein employ a guiding technique, in which the guiding direction is controllable by the frequency of incident light, without regard to the direction or the shape of the light beam. In this technique, an optical asymmetry is introduced into the particle to be guided to form a composite particle. The composite particle includes two faces (also referred to as two sides or two facets) that preferentially absorb light of different wavelengths, regardless of the particle orientation. For example, material on one side of the particle can preferentially absorb light at 500 nm and material on the other side can preferentially absorb light at 800 nm. The difference in resonant absorption spectra of the two materials can create a bidirectional local thermal gradient that is externally switchable by changing the wavelength of the incident light. This thermal gradient then induces a thermophoretic drift that moves the composite particle. Detailed stochastic simulations also demonstrate that a two-faced nanoparticle can be guided using the optically induced thermophoretic drift as the propulsion mechanism.

This optical guiding technique using asymmetric optical properties of composite particles has several advantages compared to conventional guiding methods. For example, the guiding direction of this technique depends on the frequency of the illuminating light beam, instead of the shape or coherence of the light beam. As a result, this technique does not require the complex focusing or shaping elements of conventional guiding methods and can work in strongly scattering environments. In addition, this technique relies only on the particle location or distance to the target, instead of the particle orientation. Therefore, the technique can be used to guide sub-wavelength particles (i.e., particles smaller than wavelength of the incident light) that are too small to be fully optically resolved and particles that cannot be visualized at all in conventional methods. Furthermore, owing to biocompatibility and nontoxicity of light, this technique to particle guiding can be conveniently used in biological and in vivo applications.

Composite Particles for Optical Guiding

Figures 1A, 1B:
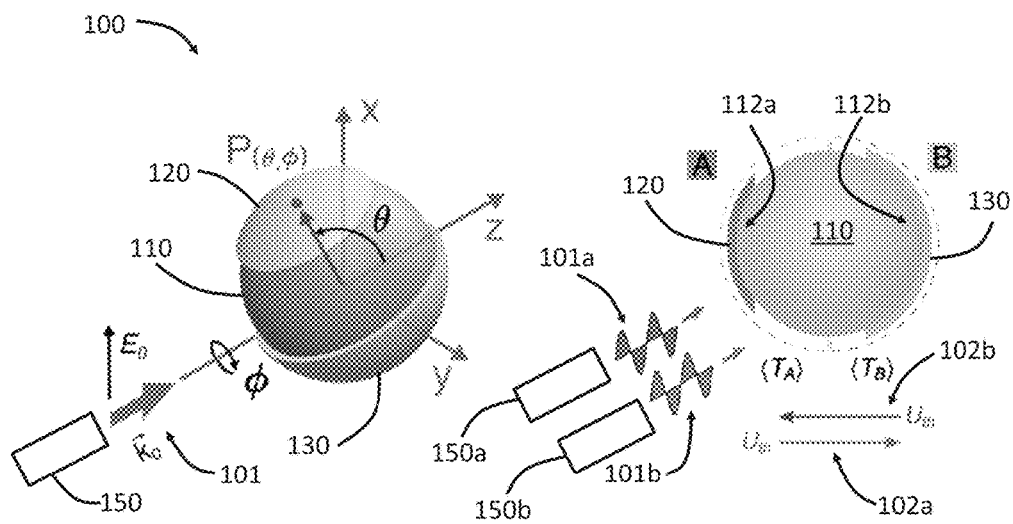
FIGS. 1A and 1B show a perspective view and a side view, respectively, of a composite particle for optical guiding.

FIGS. 1A-1B show a perspective view and a side view, respectively, of a composite particle 100 for optical guiding. The composite particle 100 (also referred to as a Janus particle or particle) includes a core 110 having a first side 112a (also referred to as side A, see FIG. 1B) and a second side 112b (also referred to as side B, see FIG. 1B). The first side 112a and the second side 112b are opposite to each other. A first cap 120 is disposed on the first side 112a and a second cap 130 is disposed on the second side 112b. In operation, a light beam 101, provided by a light source 150, illuminates the particle 100. The two caps 120 and 130 absorb different amounts of the incident light beam 101, thereby creating a temperature difference between the first cap 120 and the second cap 130. As understood in the art, a temperature difference (also referred to as a temperature gradient) can induce a thermophoretic drift (also referred to as a thermophoretic force), which can move the composite particle 100.

To move the composite particle 100 in more than one direction, the two caps 120 and 130 include materials that allow for selective light absorption based on the wavelength of the incident beam 101. As illustrated in FIG. 1B, upon illumination by a light beam 101a, provided by a first light source 150a at a first wavelength $\lambda_1$, the absorption of the first cap 120 is higher than the absorption of the second cap 130, thereby generating a first thermophoretic drift 102a along a first direction from the first cap 120 toward the second cap 130. In contrast, upon illumination by a light beam 101b provided by a second light source 150b at a second wavelength $\lambda_2$, the absorption of the first cap 120 is lower than the absorption of the second cap 130, thereby generating a second thermophoretic drift 102b along a second direction from the second cap 130 toward the first cap 120. As a result, the direction of the temperature gradient (i.e., $\langle T_A \rangle - \langle T_B \rangle$ shown in FIG. 1B) is wavelength-dependent. The optically induced thermophoretic drift $U_{th}$, proportional to the temperature gradient, can be used to transport the particle 100 in space along different directions by adjusting the wavelength of the incident light beam 101.

The composite particle 100 shown in FIG. 1A-1B has a spherical shape for illustrating purposes. In practice, the composite particle 100 can have various other shapes, such as cylindrical, rounded, ellipsoidal, acircular, flat, flake-like, elongated, cubic, or irregular shapes.

The overall size of the composite particle 100 can be about 10 nm to about 100 µm (e.g., about 10 nm, about 20 nm, about 30 nm, about 50 nm, about 100 nm, about 200 nm, about 300 nm, about 500 nm, about 1 µm, about 2 µm, about 5 µm, about 10 µm, about 20 µm, about 50 µm, about 75 µm, or about 100 µm, including any values and sub ranges in between).

The light beam 101 can include various types of beams. In one example, the light beam 101 can be focused so as to increase the beam intensity (also referred to as the irradiance), which in turn can increase the temperature gradient and the resulting thermophoretic force that drives the composite particle 100. In another example, the light beam 101 can be defocused (e.g., a collimated or diverging beam) to cover a larger area and drive multiple composite particles or ensure that the composite particle 100 is within the illumination area of the light beam 101.

In yet another example, the light beam 101 can include beams that are Gaussian (including Hermite-Gaussian and Laguerre-Gaussian), collimated, uncollimated, unpolarized, linearly-polarized, circularly-polarized, or beams of arbitrary polarization state. The light beam 101 can also carry orbital angular momentum. The flexibility in choosing parameters of the light beam 101 can be attributed to the underlying mechanism of the guiding technique, which depends on light absorption instead of beam focusing or shaping in conventional optical guiding methods.

In one example, the intensity of the light beam 101 can be about 0.1 mW/µm$^2$ to about 5 mW/µm$^2$ (e.g., about 0.1 mW/µm$^2$, about 0.2 mW/µm$^2$, about 0.3 mW/µm$^2$, about 0.5 mW/µm$^2$, about 1 mW/µm$^2$, 2 mW/µm$^2$, 3 mW/µm$^2$, 4 mW/µm$^2$, or 5 mW/µm$^2$, including any values and sub ranges in between). In another example, other intensities of the light beam 101 can also be used, depending on, for example, the desired speed of motion of the particle 100.

In FIGS. 1A-1B, one light beam is shown for each wavelength (i.e., 101a at $\lambda_1$ and 101b at $\lambda_2$). In practice, there can be multiple beams at each wavelength. For example, at one wavelength ($\lambda_1$ or $\lambda_2$), two light beams can be directed from opposite directions toward the composite particle 100 so as to more uniformly illuminate the composite particle 100. In another example, multiple light beams (more than two beams) at each wavelength can be transmitted toward the composite particle 100. Each beam can come from various directions, such as toward the first side 112a, toward the second side 112b, or anywhere else on the composite particle 100.

The core 110 of the composite particle can include various materials. In one example, the core 110 can include dielectric materials. In another example, the core 110 can include polymer materials, such as polystyrene. In yet another example, the core 110 can include metal oxides such as tantalum oxide, titanium oxide, niobium oxide, or aluminum oxide, among others. In yet another example, the core 110 can include transparent conductive materials, such as silicon oxide, doped zinc oxide, aluminum doped zinc oxide, indium tin oxide, or fluorine doped tin oxide, among others. In yet another example, the core 110 can include non-oxide ceramics, such as carbides, nitrides, borides, and silicides, among others. In yet another example, the core 110 can include metals.

The materials of the two caps 120 and 130 can also be selected from the materials described above, such as dielectrics, metal oxides (e.g., tantalum oxide, titanium oxide, niobium oxide, aluminum oxide, etc.), oxides including transparent conductive films (e.g. silicon oxide, doped zinc oxide, aluminum doped zinc oxide, indium tin oxide, fluorine doped tin oxide, etc.), non-oxide ceramics (e.g. carbides, nitrides, borides, and silicides, etc.), and metals. In general, though, the core 110, the first cap 120, and the second cap 130 include different materials that have different absorption spectra. For example, the two caps 120 and 130 can include materials that preferentially absorb light at the first wavelength and the second wavelength, respectively, so as to establish a temperature gradient across the particle 100. The core 110 can include a material that is not absorbing light at either the first wavelength or the second wavelength so as to maintain the gradient between the two caps 120 and 130. In addition, it can also be desirable for the core 110 to include thermally insulating materials to maintain the temperature gradient between the first cap 120 and second cap 130.

In one example, the two caps 120 and 130 can be conformally disposed on the core 110 of the composite particle 100. For example, the caps 120 and 130 can be deposited on the core 110 via chemical vapor deposition (CVD), low-temperature chemical vapor deposition (LP-CVD), or any other techniques known in the art. In another example, the two caps 120 and 130 can be pre-fabricated and then bonded to the core 110.

The thicknesses of the two caps 120 and 130 can be about 1 nm to about 500 nm (e.g., about 1 nm, about 10 nm, about 15 nm, about 20 nm, about 25 nm, about 30 nm, about 40 nm, about 50 nm, about 60 nm, about 70 nm, about 80 nm, about 90 nm, or about 100 nm, or about 500 nm, including any values and sub ranges in between). In one example, the two caps 120 and 130 can have the same thickness. In another example, the two caps 120 and 130 can have different thicknesses, for example, to facilitate the establishment of the desired temperature gradient. The thickness of the two caps 120 and 130 can depend on the material and size of the core 110. In general, a larger core 110 can have thicker caps 120 and 130. For example, a 10 µm core can have thicker caps than those on a 10 nm core.

The composite particle 100 shown in FIGS. 1A-1B includes two sides 112a and 112b (and accordingly two caps 120 and 130) for illustrative purposes. In practice, more than two caps can be used. For example, the composite particle 100 can include three caps disposed on three different locations of the core 110. Each cap preferentially absorbs light at a particular wavelength. Accordingly, three light beams 101 at three distinct wavelengths can be used to move the composite particle at three different directions or superpositions of these directions. In general, a larger number of caps can allow for more precise guiding of the particle 100.

In practice, the composite particle 100 can be used as a vehicle to convey agents to a target location. For example, the composite particle 100 can convey medicine attached to the composite particle 100 to target locations in human bodies to achieve precise and local treatment. Agents that can be conveyed by the composite particle 100 can include biological materials (e.g. proteins, tissues, lipids, enzymes, cilia, flagella, etc.) or chemical substances (e.g. functional groups, acids, etc.), for purposes that can include biological labeling, drug and gene delivery, tumor destruction via localized heating, etc.

The coupling between the composite particle and the agent can be achieved by various methods. In one example, the core 110 or the caps 120/130 can include a biological or a chemical coating that can hold agents. In another example, the agent can be physically attached to the surface of the particle 100. In this example, the attachment can use special linker molecules.

In applications, the composite particle 100 is typically placed in a medium (also referred to as an environment, or surrounding material), which can be gaseous or liquid. Examples of the medium can include water, blood, and other biological and bodily fluids.

In FIGS. 1A-1B, the composite particle 100 is guided by the incident light beam 101, which creates a temperature gradient between the two caps 120 and 130. In practice, the temperature gradient can also be generated by various other means. In one example, the temperature gradient can be generated acoustically by acoustic waves of different frequencies. Different caps 120 and 130 can preferentially absorb acoustic waves at different frequencies. In yet another example, the temperature gradient can be generated electrically using, for example, alternating current (AC) or direct-current (DC) electric field(s). In yet another example, the temperature gradient can be generated magnetically using, for example, AC or DC magnetic field(s). For example, AC electric fields can heat conductors via an induction heating process. Controlling the frequency of the AC field can control the skin-depth, which in turns affects the heating intensity in a material. Materials with different skin-depths can be heated selectively depending on the AC field intensity (e.g. copper, aluminum, stainless steel, etc.). Similarly, controlling the frequency of AC magnetic fields can also selectively heat materials such as nickel, iron, cobalt, and their oxides (e.g. ferrites).

Other than the temperature gradient, gradients of other physical quantities (also referred to as environmental gradients) can also be used to guide the composite particle 100. For example, the gradient can include concentration gradient, pressure gradient, chemical gradient, charge gradient, and magnetic gradient, among others. In general, the composite particle 100 can be guided when there is an asymmetry of the particle (illustrated by different "sides" the particle has) and an external control of the direction of the induced gradient.

Light beams can usually be employed in these various approaches to create the environmental gradient. Wavelengths of the light beam can be in spectral ranges associated with increased biological transparency of, for example, organs and tissues. Similarly, when the gradient is controlled by the frequency of an acoustic or a magnetic field, the frequency can also be in the range where biological materials (e.g., organs and tissues) have increased transparency. These wavelengths can be useful for object guiding in biological, medicinal, and in-vivo applications.

Figure 2A:
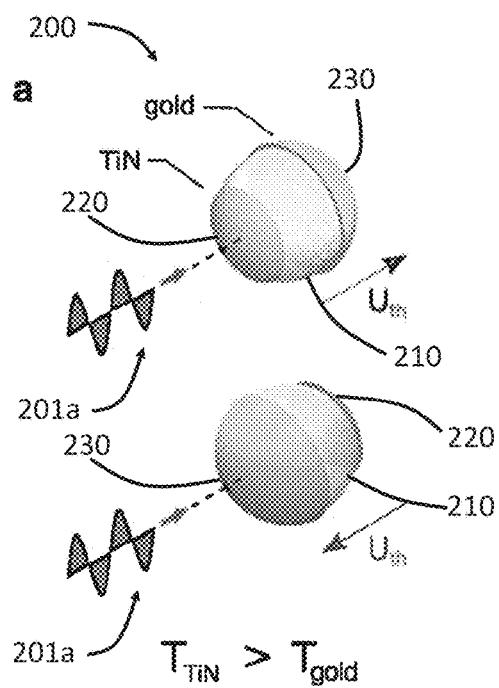
FIGS. 2A-2B illustrate guiding a compositing particle with TiN and gold layers.
Figure 2B:
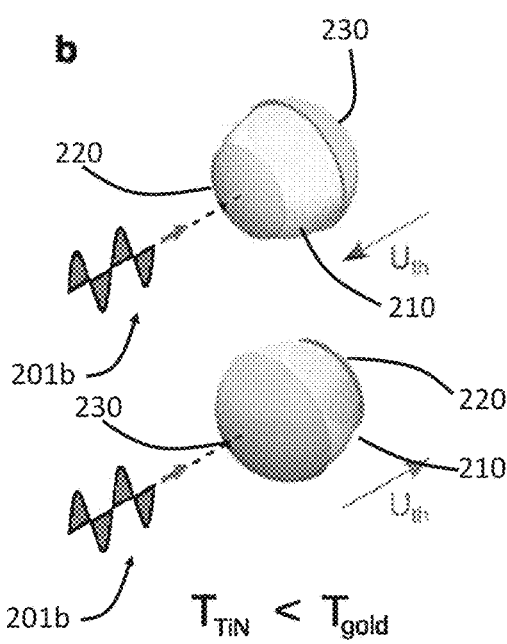

FIGS. 2A-2B illustrating optical guiding of a composite particle 200 including titanium nitride (TiN) on one side and gold on the other side. The composite particle 200 includes a core 210. A first cap 220 made of TiN is disposed on one side of the core 210 and a second cap 230 made of gold is disposed on an opposite side of the core 210. Upon illumination of a first light beam 201a at 800 nm (shown in FIG. 2A), the first cap 220 gets hotter than the second cap 230, thereby inducing a thermophoretic drift $U_{th}$ along a first direction from the first cap 220 toward the second cap 230. In contrast, upon illumination of a second light beam at 500 nm (shown in FIG. 2B), the second cap 230 made of gold gets hotter than the first cap 220. The resulting thermophoretic drift $U_{th}$ is along a second direction from the second cap 230 toward the first cap 220. The two wavelengths 800 nm and 500 nm can then determine the direction of the thermophoretic drift that the particle experiences.

Translational and Rotational Particle Dynamics

The guiding of the composite particles can be analyzed with a plane, linearly polarized, incident light wave of the form $E_{inc}=\hat{x}E_0 \exp(ik_0 z - i\omega t)$ impinging on a composite asymmetric particle (e.g., shown in FIGS. 1A-1B). Because the particle is roughly spherical, its motion can be approximated by a set of differential equations for translation and rotation:

$$m\frac{d^2 x}{dt^2} = F_{opt}(P) + \frac{1}{\mu}U_{th}(P) - c_t\frac{dx}{dt} + \sigma_t \xi(t) \quad (1)$$

$$I\frac{d\omega}{dt} = M_{opt}(P) - c_{rot}\omega + \sigma_{rot}\zeta(t) \quad (2)$$

where x is the position of the particle, $\omega$ is its angular velocity, and m and I are the particle mass and the moment of inertia, respectively. The particle mobility $\mu$ relates to the viscous drag through $1/\mu = c_t = 6\pi\eta R$; similarly, for rotation $c_{rot} = 8\pi\eta R^3$, where R is the particle radius and $\eta$ is the viscosity of the medium. For example, the ambient medium can be water and the corresponding $\eta$ is about $8.9 \times 10^{-4}$ Pa·s. The diffusion in the system can be characterized by the Langevin stochastic terms ($\xi, \zeta$), where $\sigma_t = (2k_b T c_t/m)^{1/2}$, $\sigma_{rot} = (2k_b T c_{rot}/I)^{1/2}$, and $\xi(t)$ is a set of independent Gaussian variables with zero mean and covariance $\langle \xi_i(t)\xi_j(t') \rangle = \delta_{ij}\delta(t-t')$ (the same is true for $\zeta(t)$). Finally, the orientation of the particle (which is fixed in the frame of the particle) is coupled to its angular velocity through $dP(t)/dt = \omega(P,t) \times P(t)$. This, together with equation (1) and (2), can be used to evolve the position and orientation of the particle in time. These equations are valid for laminar flows, where the expressions for the translational and rotational viscous drags are applicable.

In equations (1) and (2) above, one influential term for particle guiding is the self-induced thermophoretic drift $U_{th}$. This drift depends on the particle orientation P. Thus, this analysis explores all possible directions that the particle can be facing with respect to the incident light beam. Different incident directions can be given by the angle that the apex of the cap A (point P) makes relative to the coordinate system. Angles $\theta$ and $\phi$ correspond to the polar (with respect to $\hat{z}$) and the azimuthal angle, respectively (see, e.g., FIGS. 1A-1B).

The scattered electromagnetic fields (without any approximations) can be obtained using a finite-element-method solver (e.g., Comsol Multiphysics). Subsequently, the steady-state temperature distribution in the system can be calculated (also in Comsol). For the heat transfer simulation, the absorbed electromagnetic power in the caps A and B serves as the heat source. From the equilibrium temperature distributions, the average surface temperatures, $\langle T_A \rangle$ and $\langle T_B \rangle$, which correspond to the hemispheres that contain caps A and B, respectively, can be evaluated (indicated by dashed half circles in FIG. 1B).

As previously mentioned, the thermophoretic drift $U_{th}$ that the particle experiences is directly proportional to the optically induced temperature gradient. While the magnitude of the thermophoretic drift scales linearly with the intensity of the actuating light, the sign of $U_{th}$ can be controlled by switching the beam frequency/wavelength. To demonstrate this behavior, gold and TiN (or any other materials described above with reference to FIGS. 1A-1B) can be used as the two materials that make the caps (e.g., caps 120 and 130 shown in FIGS. 1A-1B and caps 220 and 230 shown in FIGS. 2A-2B). The choice of these two materials can be predicated on their relative resonant absorption strengths of light of different wavelength. The relative absorption of these two materials can be analyzed by examining how a uniform spherical particle absorbs light.

In equations (1) and (2) above, $M_{opt}$ and $F_{opt}$ refer to the optical torque and force (radiation pressure). For a 1 μm polystyrene particle with a gold and a TiN cap, theoretical estimate (e.g., from the Maxwell stress tensor) of the radiation pressure force can be about 4 pN/mWμm$^{-2}$, with some variation depending on the particle orientation. Experimentally, the thermophoretic drift force can be stronger than the radiation pressure force for a Janus particle (e.g., having a core and only one coating on one side). Nevertheless, the radiation pressure can be easily eliminated experimentally, for example, by considering counter-propagating beams, or motion confined to a plane perpendicular to illumination.

Figures 3A, 3B:
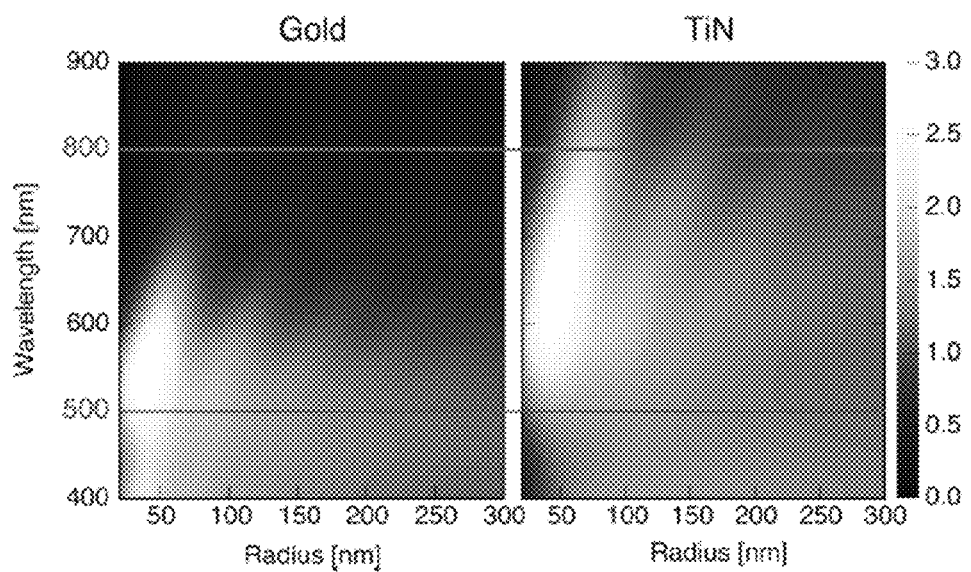
FIGS. 3A and 3B show calculated absorption efficiency as a function of wavelength and radius for a homogeneous gold spherical particle and TiN spherical particle, respectively, in water.

FIGS. 3A and 3B show calculated absorption efficiency as a function of wavelength and radius for a homogeneous spherical particle made of gold (FIG. 3A) and homogenous spherical particles made of titanium-nitride (FIG. 3B) in water. Wavelengths at 500 nm and 800 nm as used in FIGS. 2A-2B are indicated by horizontal lines. The absorption efficiency $Q_{abs}$ is calculated from Mie scattering equations.

FIGS. 3A-3B show a clear difference in the optimal wavelength ranges for absorption in the two materials. For example, the TiN sphere has strong absorption at wavelengths of about 550 nm to about 810 nm and the gold sphere has strong absorption at wavelengths of about 450 nm to about 620 nm. Therefore, when guiding composite particles including TiN and gold (e.g., the particle 200 shown in FIGS. 2A-2B), one light beam can have a wavelength of about 550 nm to about 810 nm (e.g., about 550 nm, about 580 nm, about 610 nm, about 630 nm, about 660 nm, about 690 nm, about 720 nm, about 750 nm, about 780 nm, about 790 nm, about 800 nm, or about 810 nm, including any values and sub ranges in between) to create a thermophoretic force along a direction from the TiN side toward the gold side. To create a thermophoretic force along the opposite direction from the gold side toward the TiN side, the second light beam can have a wavelength of about 450 nm to about 620 nm (e.g., about 450 nm, about 470 nm, about 490 nm, about 500 nm, about 510 nm, about 530 nm, about 550 nm, about 570 nm, about 590 nm, or about 600 nm, including any values and sub ranges in between).

As shown in FIGS. 3A-3B, TiN appears to have a broader spectral absorption range compared to the corresponding absorption range of gold. Therefore, the TiN cap in the composite particle can be made smaller than the gold cap. This asymmetric size can further facilitate the establishment of temperature gradient across the composite particle by ensuring that at 500 nm the hemisphere with the gold cap reaches a higher temperature, independent of the orientation of the composite particle with respect to the incoming light.

From the analysis above, it can be seen that given the choice of materials for the core (polystyrene) and the two caps (gold and TiN), the geometry of the composite particle can be further optimized to achieve bi-directional guiding. For example, with the size of the particle (e.g., diameter of about 1 μm) and the caps' thicknesses (e.g., about 60 nm) fixed, the relative sizes of the two caps can be chosen such that, no matter the orientation of the particle with respect to the incident beam, the frequency of the beam solely determines which of the two half-surfaces is hotter.

Figures 4A, 4B:
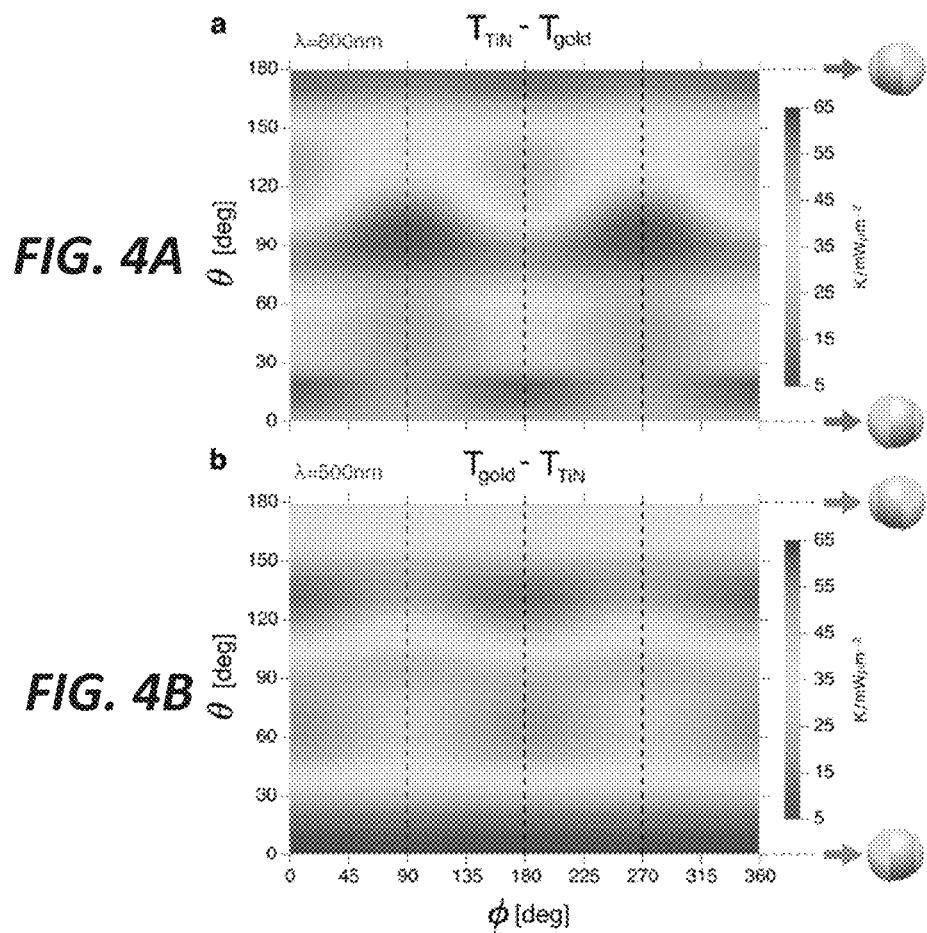
FIGS. 4A and 4B show calculated differences in average surface temperature of a composite particle including a TiN cap and a gold cap under illumination of light beams at 800 nm and 500 nm, respectively.

FIGS. 4A-4B show calculated differences in the average surface temperature of the hemisphere that contains the TiN cap and the hemisphere that contains the gold gap for all particle orientations ($\theta$=0-180°, $\phi$=0-360°). The temperature $T_{Au}$ corresponds to the average surface temperature of the hemisphere that contains the gold cap and temperature $T_{TiN}$ corresponds to the average surface temperature of the hemisphere that contains the TiN cap. When the wavelength of the incident beam of light is 800 nm as shown in FIG. 4A, the temperature of the side with the TiN cap is always higher than the temperature of the side with the gold cap, regardless of the orientation of the particle. When the TiN cap faces toward the incoming 800 nm beam (i.e., $\theta$=180°, top sketch on the right in FIG. 4A), it is reasonable to expect that the $T_{TiN}$ side may absorb more and reach a higher temperature. However, even when the gold cap directly faces the incoming beam (i.e., $\theta$=0°, bottom sketch on the right in FIG. 4A), the TiN side is still hotter when $\lambda$=800 nm. For $\lambda$=500 nm, the opposite is true: the hemisphere with the gold cap is always hotter independent of the orientation of the particle.

To achieve the desired bi-directional guiding at 800 nm and 500 nm, the size of the gold cap can correspond to the spherical angle (also referred to as the solid angle) of 6π/5, and the size of the TiN cap can correspond to the spherical angle of 2π/5 (the relative size of the two caps can also be seen in FIGS. 1A-1B and FIGS. 2A-2B).

In the above analysis, all parameters, including the permittivity and heat conductivity, are assumed to be temperature-independent in the relevant temperature range. When this is the case, the Maxwell's equations and the heat equation are linear, and the induced temperature difference (between the hot hemisphere and the cold hemisphere) is directly proportional to the intensity of the incident light beam. Simulations for different incident source intensities confirm this behavior (for arbitrary particle orientation). Hence, the calculated quantities are normalized to the beam intensity. In addition, upon illumination of light beams having strong enough light intensity, the intense local heating can alter the particle's environment, including viscosity and the thermophoretic mobility. However, for the source intensities simulated here, qualitative changes are not expected.

Robustness of the Composite Particle

Since the composite particles described herein (e.g., the particles 100 in FIGS. 1A-1B and 200 in FIGS. 2A-2B) are usually in micro- or nano-scales, imperfection in fabrication of these particles may introduce a deviation of the particle dimensions from the specified dimensions. Detailed analysis shows that small deviations introduce no qualitative change in the heating patterns.

To test the sensitivity of the composite particle to potential deviations during manufacturing such as material deposition, the geometrical parameters that define the structure can be perturbed. The results are shown in Table 1. Unless specified otherwise, the following parameters (default values) are used. The radius R of the particle is 500 nm. The cap thickness $d_{cap}$ is 60 nm, and the cap coverage areas are given by spherical angles $\Omega$(TiN)=2π/5 and $\Omega$(Au)=6π/5. For these variations, the resulting temperature differences between the two hemispheres are then calculated, at both the 500 nm and the 800 nm light. These calculated values are then normalized to the incident beam intensity (here $\theta$=90°, $\phi$=0°).

As shown in Table 1, the variations in geometrical parameters (of ±10%) introduce no qualitative change in the heating patterns: primarily, the sign of the temperature difference is unchanged when the parameters are perturbed. The temperatures appear to be most sensitive to the overall particle size, which is the largest dimension in the system and determines the scattering and the heat distribution in the entire structure. In comparison, influences from the variations of other parameters are much less significant. This shows that deviations in the caps during fabrication should not significantly alter the behavior predicted by the analysis.

TABLE 1

Robustness of the composite particle design to variations in geometrical parameters

| Parameter | Variation | $\lambda = 500$ nm<br>T(Au) − T(TiN)<br>[K/mW µm$^{-2}$] | $\lambda = 800$ nm<br>T(TiN) − T(Au)<br>[K/mW µm$^{-2}$] |
|---|---|---|---|
| Default values | None | 39.3 | 32.7 |
| R = 500 nm | −10% | 54.6 | 20.1 |
|  | +10% | 32.0 | 71.8 |
| $d_{cap} = 60$ nm | −10% | 40.6 | 25.0 |
|  | +10% | 38.5 | 40.0 |
| $\Omega$(TiN) = $2\pi/5$ | −10% | 43.1 | 28.6 |
|  | +10% | 35.6 | 36.5 |
| $\Omega$(Au) = $6\pi/5$ | −10% | 36.9 | 34.3 |
|  | +10% | 41.3 | 31.7 |

Edge Effects in Composite Particles

In problems of electromagnetics, sharp edges or pointy corners may lead to highly intense and concentrated electric fields. Consequently, such enhanced fields may become "hot spots" and sources of particularly strong and localized heating. Therefore, it can be beneficial to study these edge effects, in particular their potential influence on the heating of the resulting composite particles.

Figures 5A, 5B, 5C, 5D:
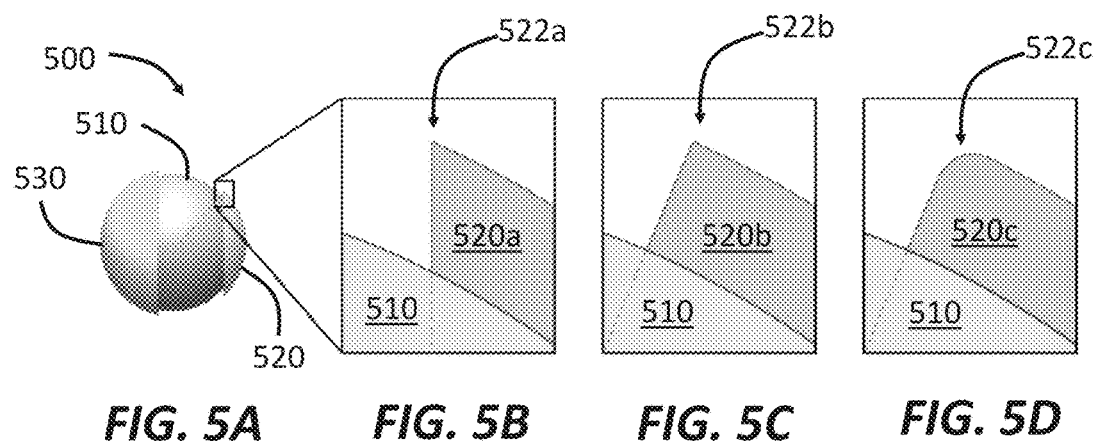
FIGS. 5A-5D illustrate examples of edge configurations in composite particles shown in FIGS. 1A-1B.

FIGS. 5A-5D illustrate several examples of edge configurations in composite particles described herein. FIG. 5A shows a schematic of a composite particle 500 including a core 510, which has a first cap 520 disposed on one side and a second cap 530 disposed on the opposite side. FIGS. 5B-5D show three different edges 522a, 522b, and 522c, respectively, of the first cap 520. The first edge 522a shown in FIG. 5B defines an acute angle. The second edge 522b shown in FIG. 5C defines a substantially right angle. The third edge 522c has a smooth corner.

Qualitatively, numerical simulation of these three different types of edges 522a to 522c show no relevant differences in the resulting heating patterns. Quantitative analysis of these three edges 522a to 522c can be carried out by comparing the relevant temperatures in the system: the average temperature of the hemisphere with the gold cap and the average temperature of the hemisphere with the TiN cap. In finite-element simulations, it is found that these temperatures differ by less than one percent (<1%) for the three different types of edges 522a to 522c. Such a discrepancy could also be attributed to the finite meshing of the geometry of the simulation (particularly for the smooth filleted corner). Similarly, the variation in the resulting optical pressure is also small.

Intensity Regimes of Light Beams in Thermophoretic Particle Guiding

The strength of the induced thermophoretic drift relative to the translational diffusion has two extremes. On one hand, for weak light intensities, the translational diffusion dominates over the thermophoretic drift, and the particle is very weakly guided. On the other hand, for high intensities, the drift the particle experiences can be strong. A strong thermophoretic drift—provided that it is in the right direction—is desirable for traversing large distances, but may also hinder the ability to accurately approach a target. To characterize the potential of bi-directional thermophoretic guiding to localize a particle to a specific point in space $r_0$, the quantity $\chi^2 = <|r-r_0|>^2$ is evaluated when the guiding is turned "on", with the goal of bringing the particle to $r_0$. The quantity $\chi$ depends on the beam intensity as well as the guiding time step.

Figure 6:
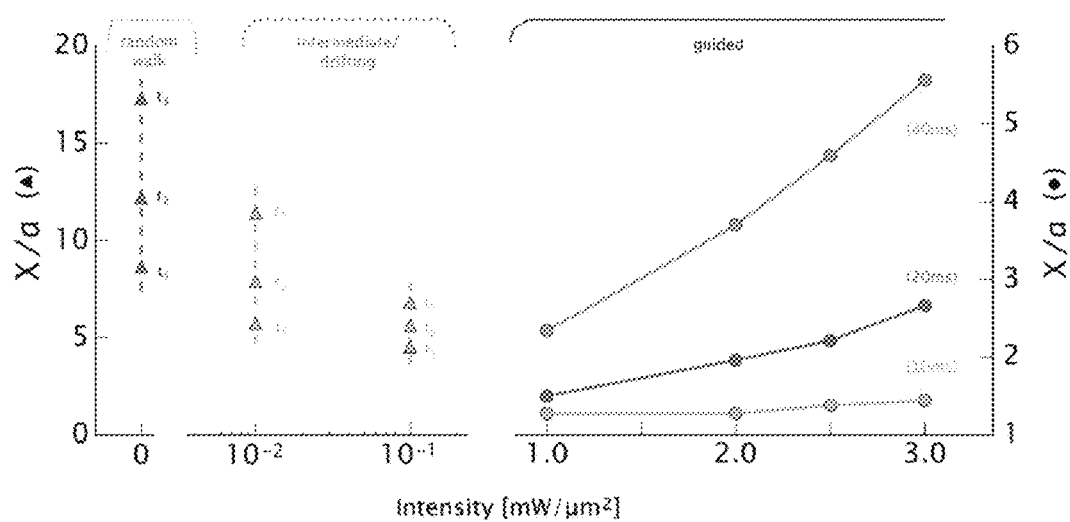
FIG. 6 shows thermophoretic guiding of composite particles shown in FIGS. 1A-1B as a function of the intensity of the light beam

FIG. 6 shows the dependence of thermophoretic guiding on the intensity of the light beam. When the thermophoretic drift ($U_{th}$) dominates over translational diffusion, the quantity $\chi$ is independent of time. This regime can be referred to as the guided/localized dynamics regime. This behavior can be observed at strong light intensities: the data points are shown as circles in FIG. 6.

A combination of source intensity and guiding time-step can confine a particle to an average distance from the target that is just slightly larger than the size of the particle itself ($\chi/a\sim1.2$), allowing for a very accurate approach to target. On the other hand, when the source intensity is zero, the particle simply performs a random walk, and the average distance increases in time as $(6D_{tr}t)^{1/2}$, where $D_{tr}$ is the translational diffusion coefficient (approximately 0.5 µm$^2$/s, for a 1 µm particle in water). This is shown in the leftmost part of FIG. 6 by triangles evaluated at times $t_1=25$ s, $t_2=50$ s, $t_3=100$ s.

In between the two extremes is the regime of drifting dynamics: here the source intensity is not strong enough to permanently confine a particle, but the particle drift ($\chi/a$) can still be made much slower than a pure random walk. These are represented as triangles (for times $t_1=25$ s, $t_2=50$ s, $t_3=100$ s) in the middle of FIG. 6.

Opto-Thermal Guiding of a Composite Asymmetric Particle

Based on the asymmetric absorption of light at different wavelengths described above, a tunable and bidirectional thermophoretic drift can be achieved. In general, the thermophoretic drift is directly proportional to the temperature gradient $$U_{th} = -D_T \nabla T \qquad (3)$$

where $D_T$ is the thermal diffusion coefficient. The thermal diffusion coefficient (also known as the thermophoretic mobility coefficient) is a complex quantity that may be affected by the particle size, material, the composition of the ambient medium, and so on. For thermophoresis in fluids, the value of $D_T$ is commonly inferred from experiments. The temperature gradient in equation (3) can be related to the induced temperature difference across the particle.

For the purposes of numerically iterating equations (1) and (2), $U_{th}/\mu$ can be written as $U_{th}/\mu = -c_{th}[\langle T_{TiN} \rangle - \langle T_{Au} \rangle]P$, where $\langle T_{Au} \rangle$ is the average surface temperature on the hemisphere that contains the gold cap (likewise for the TiN cap), P is the unit-vector pointing from the center of the gold cap to the center of the TiN cap (FIG. 1a), and $c_{th}$ is the proportionality factor. In order to estimate the magnitude of the proportionality coefficient $c_{th}$ that relates the thermophoretic drift to the difference in the average surface temperatures of the two sides, experimental data can be used. For example, experimental data for a single-capped particle of similar dimensions to those shown in FIGS. 1A-1B (e.g., a=1 µm polystyrene particle with a 60 nm gold cap) can provide an estimate for the relationship between the actuating laser intensity, thermophoretic drift, and the induced temperature difference. On the other hand, from finite-element simulations above (for the particle of the same size), the source intensity can be related to the temperature distribution, averaged over all particle orientations. Combining these yields the estimate of the proportionality constant of $c_{th}$ at around 0.01 pN/K, which can be used for numerically evolving equations (1) and (2).

Systems for Thermophoretic Guiding of Composite Particles

Figure 7:
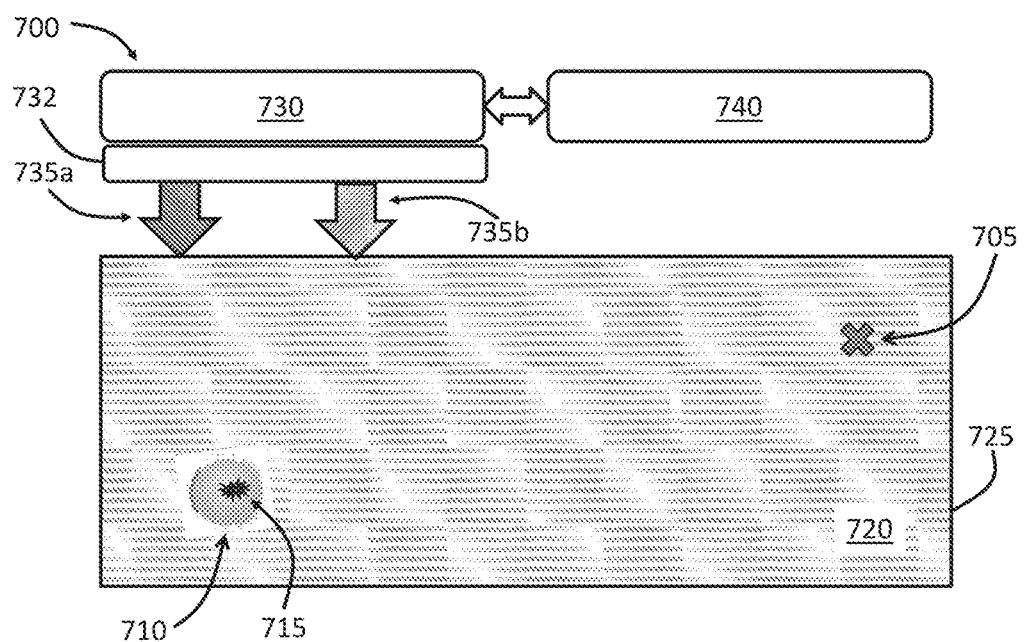
FIG. 7 shows a schematic of a system for optical guiding of composite particles.

Based on the analysis described above, systems 700 as shown in FIG. 7 can be constructed to guide composite particles toward desired location using light beams at different wavelengths. The system 700 includes a composite particle 710 to receive an agent 715 (e.g., medicine) and convey the agent 715 to a target location 705. The composite particle 710 is disposed in a surrounding medium 720 that is contained in a container 725. In practice, the container 725 can simply be human body and the surrounding medium can be body fluids. The system 700 also includes a light source 730 that delivers a first light beam 735a at one wavelength $\lambda_1$ and a second light beam 735b at another wavelength $\lambda_1$. The two light beams 735a and 735b are steered by a beam steering optic 732 to illuminate the composite particle 710 so as to create thermophoretic drifts that move the composite particle 710 toward the target location 705. In one example, the beam steering optic 732 can be integrated with the light source 730. In another example, the beam steering optic 732 can include external optics, such as mirrors, to receive output from the light source 730 and then direct the output toward the composite particle 710.

A monitoring system 740 is operably coupled to the light source 730. In one example, the monitoring system 740 measures the location of the composite particle 710. The measured location of the composite particle 710 is transmitted to the light source 730 so as to control the light source 730 to deliver light beams at an appropriate wavelength $\lambda_1$ or $\lambda_2$. In this case, the monitoring system 740 can include a microscope or other imaging devices known in the art to detect the location of the composite particle 710.

In another example, the monitoring system 740 measures the direction of motion of the composite particle 710. Measurement results can include three possible ranges. In the first range, the composite particle 710 is moving within a forward cone toward the target location 705. In the second range, the composite particle 710 is moving within a backward cone away from the target location 705. In the third range, the composite particle 710 is moving substantially perpendicular to the line connecting the composite particle 710 and the target location 705.

In yet another example, the monitoring system 740 measures the distance between the composite particle 710 and the target location 705. The measured distance is also transmitted to the light source 730 to control the light source 730 to deliver light beams at an appropriate wavelength $\lambda_1$ or $\lambda_2$. In this case, the monitoring system 740 can measure a quantity (e.g. voltage or pressure) that is proportional to the particle-target distance. For example, the quantity can be a chemical, electrical, or biological quantity that depends on how far the particle 710 is from the target location 705. A calibration process can be employed to derive the absolute distance between the composite particle 710 and the target location 705. For electric signals, capacitance can be used as the quantity to indicate the distance between the particle 710 and the target location 705. For example, both the particle 710 and the target location 705 can incde a conductive element. Then the capacitance of the system can depend on their separation and can be measured to derive the distance information.

In yet another example, the monitoring system 740 measures the change of the distance (also referred to as relative distance) between the composite particle 710 and the target location 705. In other words, the monitoring system 740 in this case detects whether the distance between the composite particle 710 and the target location 705 is increasing or decreasing without necessarily knowing the absolute distance between the composite particle 710 and the target location 705. The chemical, electrical, or biological quantity described above can also be employed here to monitor the relative distance.

Methods of Thermophoretic Guiding of Particles

Figure 8:
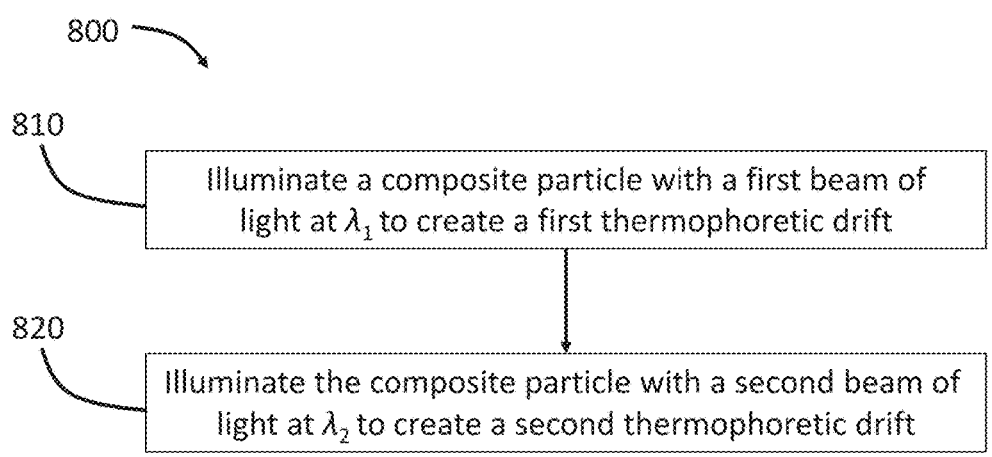
FIG. 8 illustrates a method of guiding a composite particle using light beams of different wavelengths.

FIG. 8 illustrates a method 800 of guiding particles using light beams at different wavelengths. The particles include a first side and a second side. In one example, the first side and the second side can be opposite to each other (e.g., one side is directly facing the other side on a sphere). In another example, the first side may not be directly facing the second side. In step 810, a first beam of light at wavelength $\lambda_1$ illuminates the particle to create a first thermophoretic drift along a first direction from the first side toward the second side. The created first thermophoretic drift moves the particle along the first direction. In step 820, a second beam of light at wavelength $\lambda_2$ illuminates the particle to create a second thermophoretic drift along a second direction from the second side toward the first side. The created second thermophoretic drift moves the particle along the second direction. By combining steps 810 and 820, the method 800 can move the particle on two different directions. Steps 810 and 820 can be repeated in any order and as many times as desired. A light source, such as a laser, can be used to provide the first beam and the second beam. In one example, the laser can be tunable to provide light beams at different wavelengths. In another example, two lasers operating at two wavelengths can be used to provide the two beams.

The particle is further disposed in a medium, where the particle can undergo rotation due to, for example, Brownian motion. The rotation can position the particle to different orientations, each of which can have a distinct direction defined by the line connecting the two sides of the particle. Therefore, illuminating the particle when the particle is rotated to different orientations can move the particle along an arbitrary direction in space.

Figure 9:
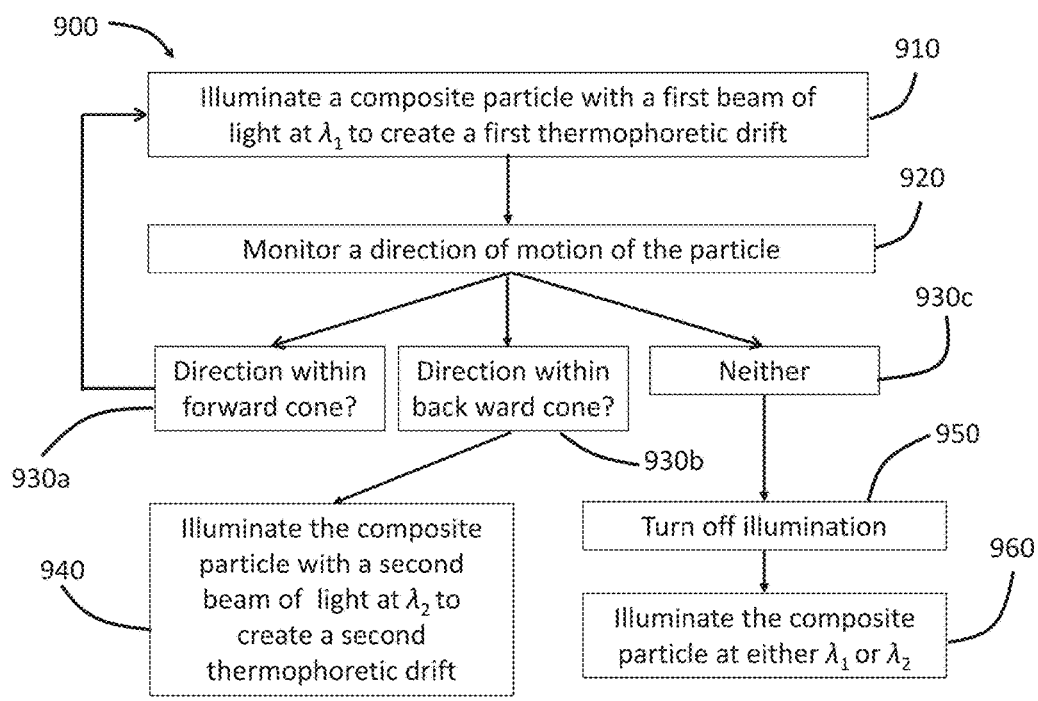
FIG. 9 illustrates a method of guiding a composite particle with feedback information of the direction of motion of the composite particle.

FIG. 9 illustrates a method 900 of guiding a particle using feedback about the location of the particle. In step 910, a first beam of light at wavelength $\lambda_1$ illuminates the particle to create a first thermophoretic drift along a first direction from the first side toward the second side. The created first thermophoretic drift moves the particle along the first direction. At step 920, a monitoring system can measure the direction of motion of the particle. As described above, the measured direction of motion can fall into three possible categories. If the measured direction is in the first category 930a, the particle is moving within a forward cone toward the target location and the method 900 proceeds back to step 910, at which the same beam of light at $\lambda_1$ is used again to illuminate the particle. This causes the particle to keep moving in the desired direction.

If the direction measured at step 920 is in the second category 930b, the particle is moving within a backward cone away from the target location and the method 900 proceeds to step 940, at which a second beam of light at wavelength $\lambda_2$ illuminates the particle to create a second thermophoretic drift along a second direction from the second side toward the first side. This causes the particle to change direction.

If the direction measured at step 920 is in the third category 930c, the particle is moving in neither the forward cone nor the backward cone and the method 900 proceeds to step 950, at which the light beam is turned off for a predetermined time interval so as to allow the particle to rotate via Brownian motion to a new orientation. At step 960, the particle is illuminated again. After step 960, the direction of motion of the particle can be monitored again and the wavelength of next illumination can depend on the measured direction as described above.

The forward cone and the backward cone as used in method 900 can each define a solid angle in three-dimensional (3D) space as understood in the art. The solid angle can be about 0.01π to about 1.99π (e.g., about 0.1π, about 0.2π, about 0.3π, about 0.5π, about 0.8π, about 1.0π, about 1.2π, about 1.4π, about 1.6π, about 1.8π, or about 1.9π, including any values and sub ranges in between). The forward and backward cones may define identical or different solid angles.

Figure 10:
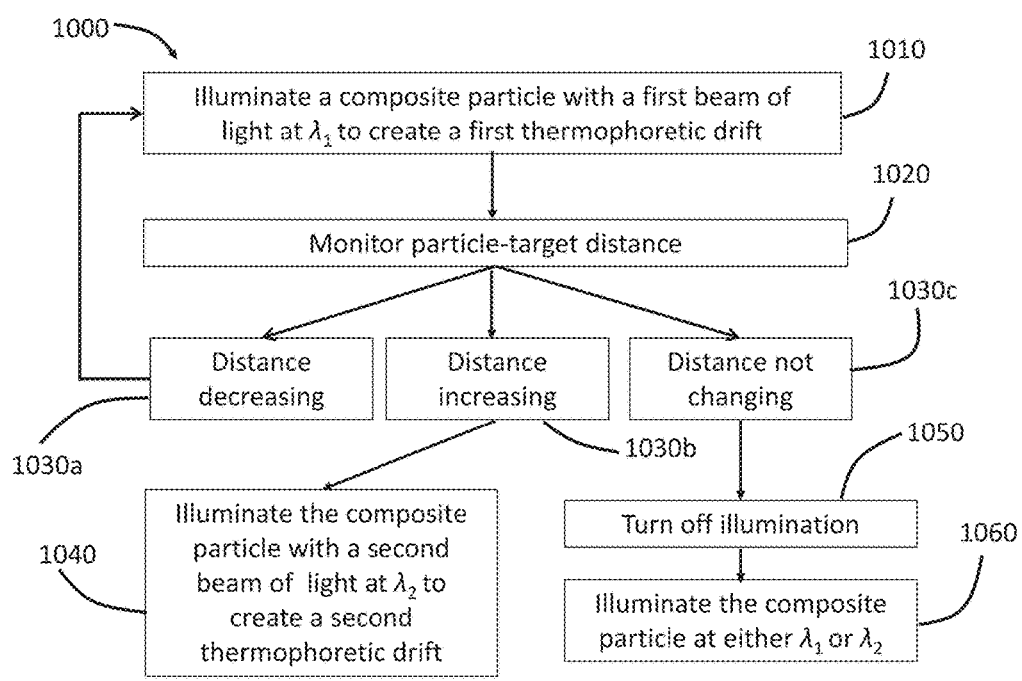
FIG. 10 illustrates a method of guiding a composite particle with feedback information of the distance between the composite particle and the target location.

FIG. 10 illustrates a method 1000 of guiding a particle using feedback information of the relative distance between the particle and the target location. In step 1010, a first beam of light at wavelength $\lambda_1$ illuminates the particle to create a first thermophoretic drift along a first direction from the first side toward the second side. The first thermophoretic drift moves the particle along the first direction. At step 1020, a monitoring system measures the relative distance between the particle and the target location. If the measured distance decreases at 1030a, the particle is moving toward the target location and the method 1000 proceeds back to step 1010, at which the same beam of light at $\lambda_1$ is used again to illuminate the particle.

If the relative distance measured at step 1020 is increasing at 930b, the particle is moving away from the target location and the method 1000 proceeds to step 1040, at which a second beam of light at wavelength $\lambda_2$ illuminates the particle to create a second thermophoretic drift along a second direction from the second side toward the first side.

If the relative distance measured at step 1020 is substantially the same as the last measurement at 930c, the particle is oriented substantially perpendicular to the direction defined by the line connecting the particle and the target location. In this case, the method 1000 proceeds to step 1050, at which the light beam is turned off for a predetermined time interval so as to allow the particle to rotate to a new orientation. At step 1060, the particle is illuminated again with either the first beam of light at $\lambda_1$ or the second beam of light at $\lambda_2$. After step 1060, the relative distance can be monitored again and the wavelength of next illumination can depend on the measured distance as described above.

Although the illumination of particles (e.g., steps 901 or 1010) and measurement of particle directions (e.g., step 920) or distances from the target location (e.g., step 1020) are illustrated as separate steps in the method 900 and 1000, in practice, the illumination and measurement can be simultaneous and in a real-time manner. For example, the monitoring system can carry out the measurements periodically. The number of measurements per second (also referred to as frame rate or fps) can be about 20 to about 1000 (e.g., about 20, about 30, about 40, about 50, about 60, about 70, about 80, about 90, about 100, about 200, about 300, about 500, or about 1000, including any values or sub ranges in between). The number of measurements per second can depend on the size of the particle and the desired degree of guiding. The measured values can be continuously transmitted back to the light sources so as to make appropriate subsequent illumination.

The time intervals used in steps 950 and 1050 are primarily for the particle to rotate to a different orientation so as to allow the next illumination to move the particle either toward or away from the target location. The time interval can be smaller than the characteristic time for rotational diffusion of the particle. The characteristic time for rotational diffusion time ($\tau_{rot}$) depends primarily on the size of the particle, its shape, viscosity of the surrounding medium, and the temperature. For a spherical particle, it is given by $$\tau_{tot} = \frac{4\pi\eta R^3}{k_B T},$$

where R is the radius of the particle, $\eta$ the viscosity of the medium, and T the thermodynamic temperature. As an example, for a 1 μm particle in water, $\tau_{rot} \approx 0.34$ s. Hence, for a particle of this size, in water, the time interval can be smaller than this. It can be about 1 ms to about 300 ms (e.g., about 20 ms, about 30 ms, about 40 ms, about 50 ms, about 60 ms, about 70 ms, or about 80 ms, including any values or sub ranges in between).

Figures 11A, 11B:
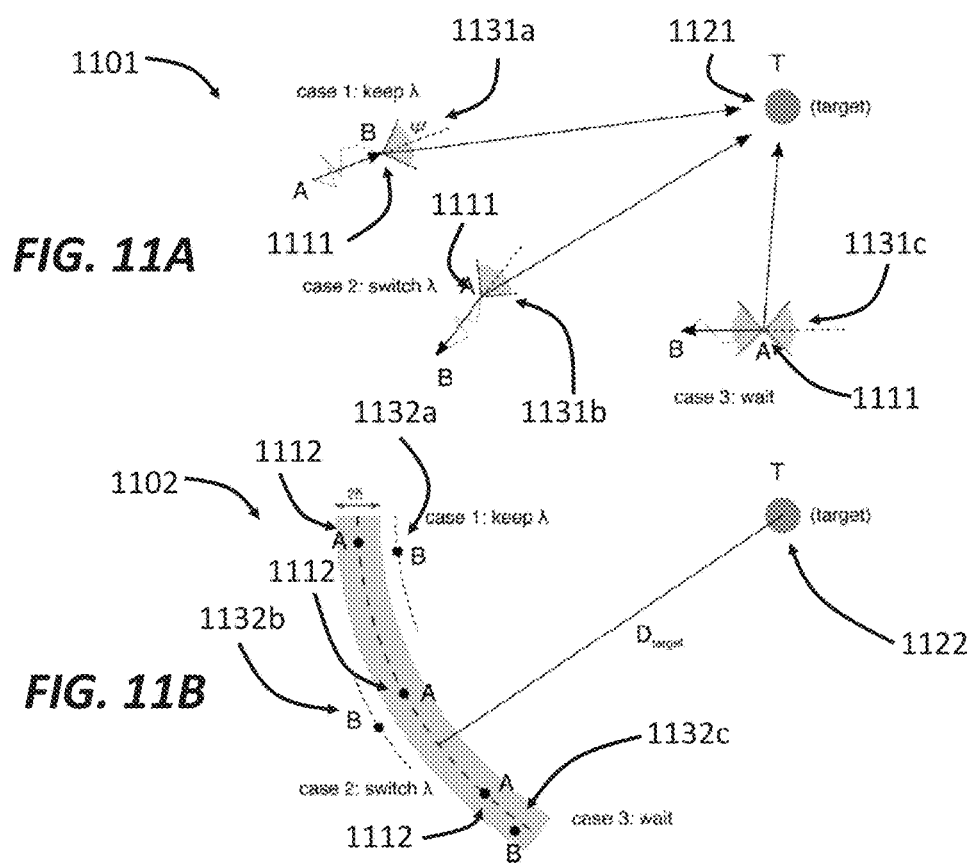
FIGS. 11A and 11B are schematics illustrating the methods shown in FIG. 9 and FIG. 10, respectively.

FIGS. 11A and 11B are schematics illustrating the methods 900 and 1000, respectively. In FIG. 11A, a particle 1111 is guided toward a target location 1121. In a time interval $\tau_1$, the particle 1111 is driven from A to B due to the induced temperature difference (as well as translational diffusion). The motion of the particle 1111 can fall into at least three different scenarios. In the first case, when the direction to target (BT line) is within the forward cone 1131a (i.e., angle ψ around AB line), the light of the same wavelength is used for the next interval $\tau_1$. In the second case, when the direction to target (BT line) is within the backward cone (of the same angle ψ), the wavelength of the illuminating light beam is switched (e.g., from 500 to 800 nm, or vice versa). In the third case, when neither is true, no light is used for the time interval $\tau_2$ allowing for rotational diffusion to reorient the particle. The above steps can be repeated until the particle 1111 is deemed to have reached the target location 1121. For example, the criterion to complete the guiding can be when the particle is within 5 μm of the target or the admittance cone corresponds to cos(2ψ)=0.3.

However, the particle does not need to be visualized at all for the guiding scheme to work, as shown in FIG. 11B. In FIG. 11B, a particle 1112 is guided toward a target location 1122 and a monitoring system can be employed to measure the distance to the target ($D_{target}$). In the first case, when in the time interval $\tau_1$ the particle 1112 moves to location 1132a, which is at least a distance δ closer to target location 1122, the same wavelength is repeated. In the second case, when the particle 1112 moves to location 1132b, which is more than δ further away from the target location 1122, the wavelength should be switched. In the third case, when the particle 1122 moves to location 1132c, which remains within a distance δ, the illumination is turned off for a time interval $\tau_2$.

Figures 12A, 12B:
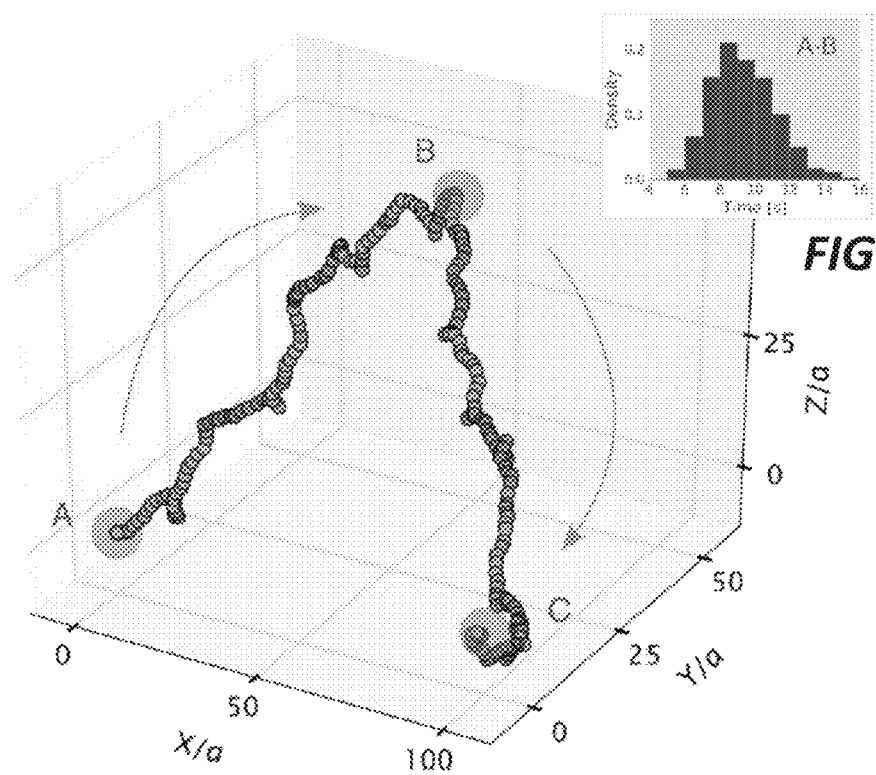
FIGS. 12A-12B show motion traces of a composite particle guided using this method illustrated in FIG. 8.

FIG. 12A shows simulated motion traces of a composite particle that is guided using the method 900 illustrated in FIG. 8. The composite asymmetric particle (diameter a=1 μm) is transported along the target A-B-C route, by switching the wavelength of the actuating light: 800 nm and 500 nm. At times, the heating is temporarily turned off to allow for rotational diffusion to reorient the particle. FIG. 12B shows a histogram of the time required to transport such a particle from A to B (N=$10^3$ runs).

In the calculation shown in FIGS. 12A-12B, the location is recorded every $\tau_1$=20 ms (e.g., from a 50 fps tracking camera), and the "wait" period is $\tau_2$=50 ms. The intensity of the light source in both cases is $I_0$=1 mW/μm². Finally, the three large circles (at the beginning, middle, and end of the path) indicate the time intervals where the algorithm chose to turn off heating and wait ($\tau_2$).

In N=$10^3$ of such simulations, the particle always reaches its target destination; the average time for the A-B portion (of length 50a√3 µm) is about 9.4 s, with the standard deviation of about 1.9 s (see FIG. 12B). The parameters for this set of simulations ($I_0$, $\tau_1$, $\tau_2$, $\psi$) are examples to showcase the feasibility of the particle transport scheme; however, the particle can be guided for a wide range of parameters, as discussed above.

One possible limitation of the guiding techniques described herein can originate from the rotational diffusion time. For example, the diffusion time $\tau_{rot}=\frac{1}{2}D_{rot}$ is about 0.34 s for a 1 µm particle in water. This can set the upper bound for the actuation time interval in the guiding scheme (i.e., $\tau_1 \leq \tau_{rot}$) to ensure the orientation of the particle does not become completely randomized. Since $\tau_{rot} \sim R^3\eta$ (see equation in [0095]), it implies that larger particles (or particles in more viscous surroundings) can be guided using slower tracking (longer $\tau_1$). More sophisticated guiding methods that leverage the combination of the beam intensity, particle's velocity, and trajectory history can be developed on top of the basic idea presented here.

As described above, one advantage of the guiding techniques herein is that they also work when only the distance to the target is known. This can be particularly useful for particles that cannot be visualized, and the distance to the target is instead inferred by other means (i.e., a chemical/biological signal that is proportional to the particle-target separation). For this approach, the average time for the A-B segment in FIG. 12A is about 10.7 s, and the standard deviation is 2.5 s (for a total of $10^3$ runs; the particle reached the target every time).

Guiding of Multiple Particles

The guiding techniques described so far use single-particle guiding as an example. Similar approaches can also be employed to manipulate and transport multiple asymmetric particles.

Figure 13:
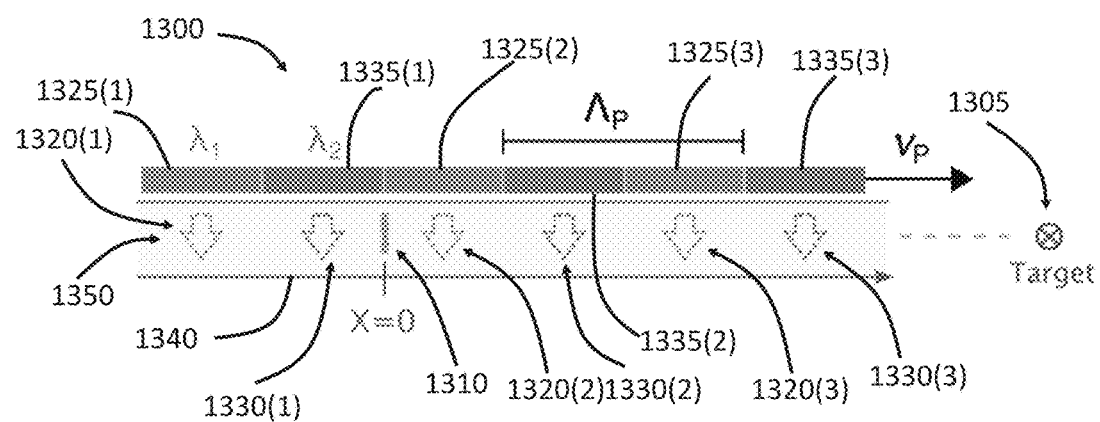
FIG. 13 shows a schematic illustrating guiding of one or more composite particles using light beams of different wavelengths.
Figures 14A, 14B, 14C, 14D:
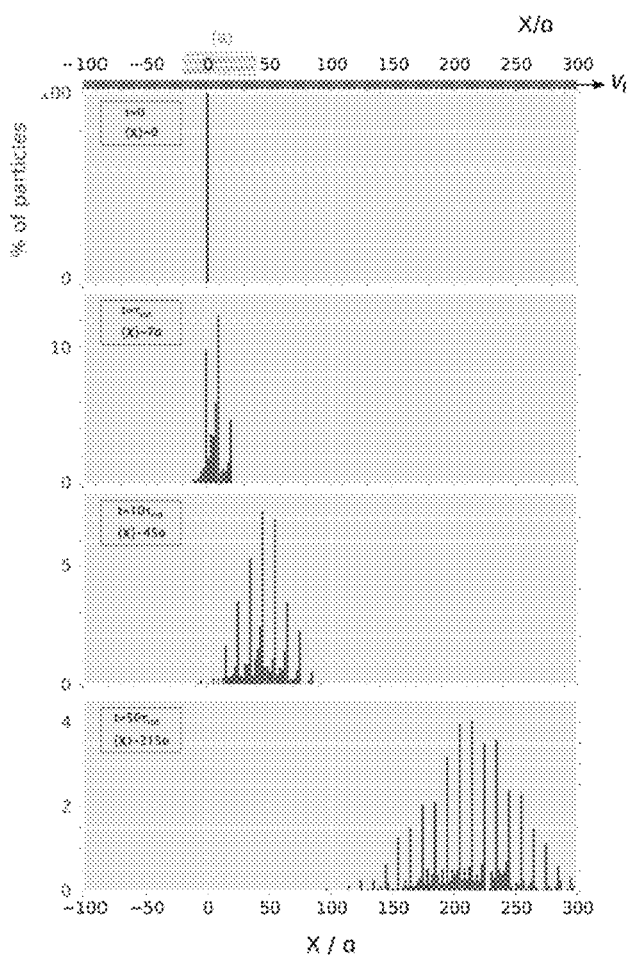
FIGS. 14A-14D shows motion traces of multiple composite particles guided using the method illustrated in FIG. 13.

FIG. 13 shows a schematic of the a system 1300 to guide multiple particles. The system 1300 includes an ensemble of N particles 1310, each of which is substantially similar to the particle shown in FIGS. 1A-1B. The particles 1310 are disposed in a tube 1340 and are initially oriented in random directions. For simplicity, the particles 1310 can be further assumed to be free from interaction with each other (e.g. in a sufficiently dilute solution). The analysis can be further limited to consider only the motion of particles 1310 along one axis (e.g. a flow in the tube 1340). The same axis (referred to as the X axis) is perpendicularly illuminated by light beams 1320 and 1330 of two wavelengths ($\lambda_1$=800 nm and $\lambda_2$=500 nm) in a periodic fashion.

Light beams 1320(1), 1320(2), and 1320(3) (collectively referred to as first light beams 1320) are at the first wavelength $\lambda_1$. Light beams 1330(1), 1330(2), and 1330(3) (collectively referred to as second light beams 1330) are at the second wavelength $\lambda_2$. The first light beams 1320 and the second light beams create a light field 1350 including alternating regions illuminated by the first beams 1320 and the second beams 1330. Such an illumination profile 1350 can be created by an array of light sources 1325 and 1335. Light sources 1325(1), 1325(2), and 1325(3) provide the light beams 1320(1), 1320(2), and 1320(3), respectively. Light sources 1335(1), 1335(2), and 1335(3) provide the light beams 1330(1), 1330(2), and 1330(3), respectively. In another example, the light field 1350 can be created by interference. The light field 1350 can be substantially periodic and the pitch $\Lambda_p$ of the light field 1350 can be about 10 µm to about 50 µm (e.g., about 10 µm, about 20 µm, about 30 µm, about 40 µm, or about 50 µm, including any values and sub ranges in between).

In the beginning (t=0), all N particles 1310 are in the vicinity of X=0 (and have some distribution in the other two dimensions, which does not affect the dynamics). The objective is to move the particles 1310 towards a target 1305 to the right (X>0). If the intensity of light is zero (or the same wavelength of light is used everywhere), the particles 1310, on average, drift in equal numbers to the left (X<0) and to the right (X>0). The periodic pattern of the light field 1350 temporarily localizes the particles 1310 at the boundaries between alternating regions. Specifically, the interfaces between the regions of different wavelengths can serve as barriers to particle motion. For example, consider a particle oriented in such a way that the 500 nm light provides a preferential thermophoretic drift to the right. As that particle crosses the interface dace of regions into the "red" region (800 nm region), it is then driven backwards, and ultimately confined to the interface itself. This localization to a specific interface can be temporary because the particle orientation can diffuse with the characteristic rotational diffusion time ($\tau_{rot}$). Nevertheless, by translating the illuminated pattern to the chosen direction, the localization points can also be shifted, without losing too many of the particles trapped in the boundaries between the alternating regions.

To move the particles 1310 toward the target 1305, the light field 1350 can be moved to the right at the rate of $v_p$. FIGS. 14A-14D illustrate the distributions of the particles 1310 at different timing points t, including t=0, $\tau_{rot}$, $10\tau_{rot}$, $50\tau_{rot}$. FIGS. 14A-14D also show the corresponding average position of the ensemble X The particles 1310, on average, are moving toward the target 1305. The guiding also works long after the initial particle orientations have been lost (i.e., for times significantly longer than $\tau_{rot}$). For the motions shown in FIGS. 14A-14D, the light beam intensity I is about 2.5 mW/µm$^2$. The periodicity $\Lambda_p$ of the light field 1250 is about 20 µm. The speed $v_P$ of the motion of the light field 1350 is about 25 µm/s.

After each $\tau_{rot}$ the particle can completely changes its orientation (due to rotational diffusion). However, the spatial profile of the light field (alternating regions of different wavelengths) can create "interfaces," where the light changes from one wavelength to the other. As a result, the particles, on average (and along one axis), prefer to "sit" at those interfaces (see, e.g., the spikes in FIG. 14).

For an individual particle (assuming that it is oriented such that it is pushed to the right in a green region), as the particle reaches the next interface between adjacent regions of different wavelengths in the light field, the particle can briefly cross into the other region, and it can then be immediately pushed to the left, i.e. back to the interface. Now that is true for a time interval during which the orientation of the particle does not change that much. If enough time passes, then the particle can assume a completely different orientation. In this case, instead of "sitting" at the original interface, the particle may be oriented such that it is "repelled" by that interface. However, the majority of the particles can move, on average, to the next two neighboring interfaces, where they can "sit" again. And the process repeats.

For a single particle, decision-making of which wavelength is to be used can be faster than the speed at which a particle "forgets" its orientation due to Brownian diffusion. In this situation, it is desirable to ensure that, on average, a particle does not "forget" its orientation as it moves from one interface to the other. Stated differently, the time for the particle to go from one interface to another can be shorter than $\tau_{rot}$. This can be achieved by changing the intensity, or the width of the alternating regions.

Other than moving the light field 1350, several other methods can also be used to move the particles 1310. In one example, the particles 1310 can be moved by changing the widths of the alternating regions. In another example, the particles 1310 can be moved by changing the location of the edge of the alternating regions. In yet another example, the particles 1310 can be moved by changing the number of alternating regions in the light field 1350.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of moving at least one composite particle, the at least one composite particle comprising a first side and a second side, the method comprising:
    illuminating the at least one composite particle with a first beam of light at a first wavelength to create a first thermophoretic drift along a first direction from the first side toward the second side, the first thermophoretic drift moving the at least one composite particle along the first direction; and
    illuminating the at least one composite particle with a second beam of light at a second wavelength, different from the first wavelength, to create a second thermophoretic drift along a second direction from the second side toward the first side, the second thermophoretic drift moving the at least one composite particle along the second direction.

2. The method of claim 1, wherein the first side comprises TiN and the second side comprises gold, and wherein illuminating the at least one composite particle with the first beam of light comprises illuminating the TiN and illuminating the at least one composite particle with the second beam of light comprises illuminating the gold.

3. The method of claim 2, wherein illuminating the at least one composite particle with the first beam of light comprises illuminating the at least one composite particle at the first wavelength of about 550 nm to about 810 nm and illuminating the at least one composite particle with the second beam of light comprises illuminating the at least one composite particle at the second wavelength of about 450 nm to about 620 nm.

4. The method of claim 1, wherein illuminating the at least one composite particle with the first beam of light comprises illuminating the at least one composite particle at an optical irradiance of about 0.1 mW/$\mu$m$^2$ to about 5 mW/$\mu$m$^2$.

5. The method of claim 1, wherein illuminating the at least one composite particle with the first beam of light comprises:
    illuminating the at least one composite particle with the first beam of light at a first incident angle; and further comprising:
    illuminating the at least one composite particle with a third beam of light at the first wavelength and at a second incident angle.

6. The method of claim 1, wherein illuminating the at least one composite particle with the first beam of light comprises illuminating the at least one composite particle for an actuation duration less than a characteristic rotational diffusion time of the at least one composite particle.

7. The method of claim 6, further comprising:
measuring at least one of a direction of motion of the at least one composite particle or a distance between the at least one composite particle and a target after the actuation duration.

8. The method of claim 1, further comprising:
monitoring a direction of motion of the at least one composite particle;
if the direction of motion is within a forward cone of directions, illuminating the at least one composite particle with the second beam of light;
if the direction of motion is within a backward cone of directions, illuminating the at least one composite particle with the first beam of light; and
if the direction of motion is outside the forward cone of directions and the backward cone of directions, turning off the second beam of light for a predetermined time interval and then illuminating the at least one composite particle with either the first beam of light or the second beam of light.

9. The method of claim 8, wherein monitoring the direction of motion of the at least one composite particle comprises imaging of the at least one composite particle at a frame rate of about 20 fps to about 1000 fps.

10. The method of claim 8, wherein the predetermined time interval is about 20 ms to about 80 ms.

11. The method of claim 1, further comprising:
measuring a first distance between the at least one composite particle and a target location before illuminating the at least one composite particle with the second beam of light;
measuring a second distance between the at least one composite particle and the target after illuminating the at least one composite particle with the second beam of light;
if the second distance is less than the first distance, illuminating the at least one composite particle with the second beam of light;
if the second distance is greater than the first distance, illuminating the at least one composite particle with the first beam of light; and
if the second distance is substantially equal to the first distance, turning off the second beam of light for a predetermined time interval and then illuminating the at least one composite particle with either the first beam of light or the second beam of light.

12. The method of claim 1, further comprising:
adjusting an intensity of the first beam of light so as to change a speed of the at least one composite particle.

13. The method of claim 1, further comprising:
disposing at least one of a biological material or a chemical substance on the at least one composite particle; and
moving the at least one composite particle to a target location so as to convey the at least one of the biological material or the chemical substance to the target location.

14. The method of claim 1, wherein the at least one composite particle comprises a plurality of composite particles and the method further comprises:
generating a light field between the plurality of composite particles and a target location, the light field including alternating regions illuminated by the first beam of light at the first wavelength and the second beam of light at the second wavelength.

15. The method of claim 14, wherein the alternating regions have a periodicity of about 10 μm to about 50 μm.

16. The method of claim 14, further comprising:
varying at least one of a width of at least one of the alternating regions, a location of an edge of at least one of the alternating regions, and a number of the alternating regions so as to move at least one composite particle in the plurality of composite particles.

17. A system for conveying an agent, the system comprising:
at least one composite particle to receive the agent, the at least one composite particle comprising a first side and a second side;
at least one light source to illuminate the at least one composite particle with a first beam of light at a first wavelength and a second beam of light at a second wavelength different from the first wavelength so as to move the at least one composite particle via a thermophoretic drift induced by at least one of the first beam of light and the second beam of light; and
a monitoring system to monitor at least one of a direction of motion of the at least one composite particle or a distance between the at least one composite particle and a target location,
wherein upon illumination by the first beam of light, the thermophoretic drift is along a first direction from the first side toward the second side,
wherein upon illumination by the second beam of light, the thermophoretic drift is along a second direction from the second side toward the first side.

18. The system of claim 17, wherein the at least one composite particle comprises:
a core comprising a thermally insulating material;
a first layer conformally disposed on a first portion of the core to form the first side;
a second layer conformally disposed on a second portion of the core opposite the first portion to form the second side.

19. The system of claim 18, wherein the first layer comprises TiN and the second layer comprises gold.

20. The system of claim 18, wherein the first wavelength is about 550 nm to about 810 nm and the second wavelength is about 450 nm to about 620 nm.

21. The system of claim 18, wherein:
the core comprises a sphere;
the first layer defines a first solid angle, and
the second layer defines a second solid angle greater than the first solid angle.

22. The system of claim 18, wherein the core has a diameter of about 10 nm to about 100 μm.

23. The system of claim 18, wherein at least one of the first layer or the second layer has a thickness of about 10 nm to about 100 nm.

24. The system of claim 17, wherein the at least one composite particle comprises a plurality of composite particles and the at least one light source is configured to generate a light field between the plurality of composite particles and a target location, the light field including alternating regions illuminated by the first beam of light at the first wavelength and the second beam of light at the second wavelength.

25. The system of claim 24, wherein the alternating regions have a periodicity of about 10 μm to about 50 μm.

26. A composite particle, comprising:
a core having a first side, a second side opposite the first side, and a diameter of about 10 nm to about 100 μm;
a first layer comprising TiN conformally disposed on the first side of the core, the first layer defining a first solid angle; and a second layer comprising gold conformally disposed on the second side of the core, the second layer defining a second solid angle greater than the first solid angle, wherein upon illumination by a first beam of light at a first wavelength, the first layer has a first temperature greater than a second temperature of the second layer so as to create a first thermophoretic drift along a first direction from the first layer toward the second layer, wherein upon illumination by a second beam of light at a second wavelength, the first layer has a third temperature less than a fourth temperature of the second layer so as to create a second thermophoretic drift along a second direction from the second layer toward the first layer.

* * * * *